(12) United States Patent
Kawamura et al.

(10) Patent No.: US 11,201,351 B2
(45) Date of Patent: Dec. 14, 2021

(54) ALL SOLID BATTERY, MANUFACTURING METHOD OF THE SAME AND SOLID ELECTROLYTE PASTE

(71) Applicant: TAIYO YUDEN CO., LTD., Tokyo (JP)

(72) Inventors: Chie Kawamura, Takasaki (JP); Sachie Tomizawa, Takasaki (JP); Daigo Ito, Takasaki (JP); Takato Satoh, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

(21) Appl. No.: 16/560,317

(22) Filed: Sep. 4, 2019

(65) Prior Publication Data

US 2020/0083563 A1    Mar. 12, 2020

(30) Foreign Application Priority Data

Sep. 11, 2018    (JP) .............................. JP2018-169750

(51) Int. Cl.
| | |
|---|---|
| H01M 10/00 | (2006.01) |
| H01M 10/0562 | (2010.01) |
| C04B 35/447 | (2006.01) |
| H01M 4/13 | (2010.01) |

(52) U.S. Cl.
CPC ....... *H01M 10/0562* (2013.01); *C04B 35/447* (2013.01); *H01M 4/13* (2013.01); *C04B 2235/3203* (2013.01); *H01M 2300/0071* (2013.01); *H01M 2300/0094* (2013.01)

(58) Field of Classification Search
CPC .. H01M 4/13; H01M 10/0562; H01M 4/0471; Y02E 60/10; C04B 2235/3217; C01B 25/37

See application file for complete search history.

(56) References Cited

U.S. PATENT DOCUMENTS

| | | | |
|---|---|---|---|
| 2009/0264276 A1 | 10/2009 | Yamashita et al. | |
| 2016/0141716 A1* | 5/2016 | Ito | H01M 10/052 429/162 |
| 2019/0027780 A1* | 1/2019 | Liu | H01M 4/366 |

FOREIGN PATENT DOCUMENTS

| | | |
|---|---|---|
| JP | 2009256140 A | 11/2009 |
| JP | 2017182949 A | 10/2017 |
| JP | 2017183052 A | 10/2017 |

* cited by examiner

*Primary Examiner* — Cynthia H Kelly
*Assistant Examiner* — Monique M Wills
(74) *Attorney, Agent, or Firm* — Law Office of Katsuhiro Arai (57) ABSTRACT

An all solid battery includes: a solid electrolyte layer including phosphoric acid salt-based solid electrolyte; a first electrode that is formed on a first main face of the solid electrolyte layer; and a second electrode that is formed on a second main face of the solid electrolyte layer, wherein a D50% grain diameter of crystal grains of the phosphoric acid salt-based solid electrolyte is 0.5 µm or less, wherein a D90% grain diameter of the crystal grains is 3 µm or less.

10 Claims, 4 Drawing Sheets

ALL SOLID BATTERY, MANUFACTURING METHOD OF THE SAME AND SOLID ELECTROLYTE PASTE

CROSS-REFERENCE TO RELATED APPLICATION

This application is based upon and claims the benefit of priority of the prior Japanese Patent Application No. 2018-169750, filed on Sep. 11, 2018, the entire contents of which are incorporated herein by reference.

FIELD

A certain aspect of the present invention relates to an all solid battery, a manufacturing method of the all solid battery, and solid electrolyte paste.

BACKGROUND

All solid batteries including oxide-based solid electrolyte is expected as a technology which is capable of providing safe secondary batteries in which neither ignition nor generation of poisonous gas caused by an organic-based electrolyte or sulfide-based solid electrolyte occurs. Generally, ionic conductivity of oxide-based solid electrolyte is smaller than those of an electrolyte solution and a sulfide-based electrolyte. And so, it is requested to reduce a thickness of the oxide-based solid electrolyte in order to secure desired response characteristic. And so, Japanese Patent Application Publication No. 2017-183052 (hereinafter referred to as Document 1) discloses a technology in which the thickness of the solid electrolyte layer is reduced by sintering solid electrolyte grains of which a grain diameter is small.

SUMMARY OF THE INVENTION

However, Document 1 does not disclose a grain diameter of slurry just before making a green sheet. Therefore, when aggregated grain diameter is large, surface roughness of the green sheet may be degraded, and short may occur.

The present invention has a purpose of providing an all solid battery, a manufacturing method of the all solid battery and solid electrolyte paste that are capable of suppressing occurrence of the short.

According to an aspect of the present invention, there is provided an all solid battery including: a solid electrolyte layer including phosphoric acid salt-based solid electrolyte; a first electrode that is formed on a first main face of the solid electrolyte layer; and a second electrode that is formed on a second main face of the solid electrolyte layer, wherein a D50% grain diameter of crystal grains of the phosphoric acid salt-based solid electrolyte is 0.5 μm or less, wherein a D90% grain diameter of the crystal grains is 3 μm or less.

According to another aspect of the present invention, there is provided a manufacturing method of an all solid battery including: preparing a multilayer structure in which first coated electric collector paste, first coated electrode paste including ceramic grains, a green sheet including phosphoric acid salt-based solid electrolyte grains, second coated electrode paste including ceramic grains and second coated electric collector paste are stacked in this order; and firing the multilayer structure, wherein a D50% grain diameter of the phosphoric acid salt-based solid electrolyte grains is 0.3 μm or less and a D90% grain diameter of the phosphoric acid salt-based solid electrolyte grains is 2 μm or less, wherein a firing condition of the firing is adjusted so that a D50% grain diameter of crystal grains of solid electrolyte in a solid electrolyte layer to be formed in the firing from the green sheet is 0.5 μm or less and a D90% grain diameter of the crystal grains is 3 μm or less.

According to another aspect of the present invention, there is provided solid electrolyte paste including: phosphoric acid salt-based solid electrolyte grains of which a D50% grain diameter is 0.3 μm or less and of which a D90% grain diameter is 2 μm or less; dispersing medium for dispersing the solid electrolyte grains; and a binder.

DETAILED DESCRIPTION

A description will be given of an embodiment with reference to the accompanying drawings.

First Embodiment

Figure 1:
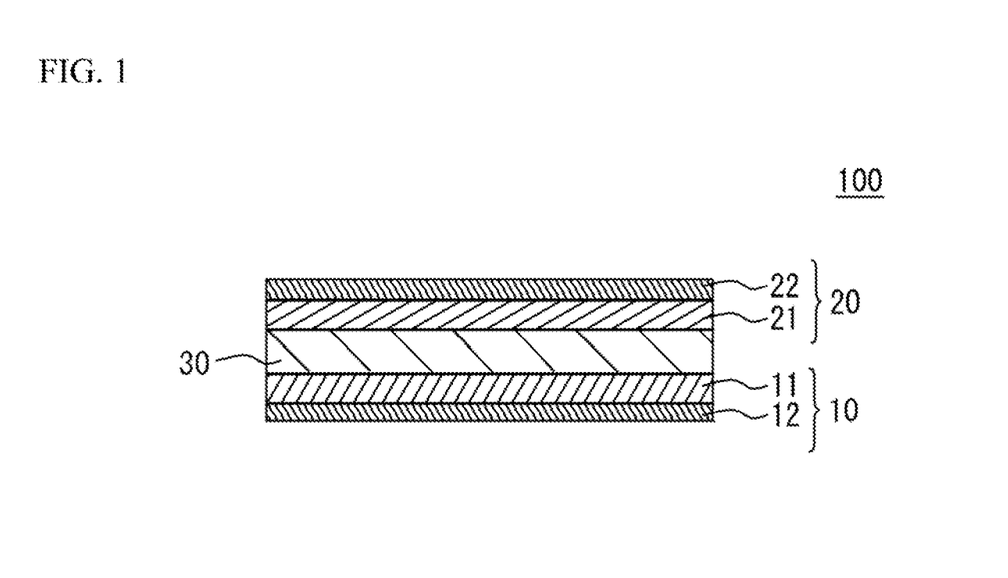
FIG. 1 illustrates a schematic cross section of an all solid battery in accordance with a first embodiment.

FIG. 1 illustrates a schematic cross section of an all solid battery 100 in accordance with a first embodiment. As illustrated in FIG. 1, the all solid battery 100 has a structure in which a first electrode 10 and a second electrode 20 sandwich a phosphoric acid salt-based solid electrolyte layer 30. The first electrode 10 is provided on a first main face of the solid electrolyte layer 30. The first electrode 10 has a structure in which a first electrode layer 11 and a first electric collector layer 12 are stacked. The first electrode layer 11 is on the solid electrolyte layer 30 side. The second electrode 20 is provided on a second main face of the solid electrolyte layer 30. The second electrode 20 has a structure in which a second electrode layer 21 and a second electric collector layer 22 are stacked. The second electrode layer 21 is on the solid electrolyte layer 30 side.

When the all solid battery 100 is used as a secondary battery, one of the first electrode 10 and the second electrode 20 is used as a positive electrode and the other is used as a negative electrode. In the embodiment, as an example, the first electrode 10 is used as a positive electrode, and the second electrode 20 is used as a negative electrode.

At least, the solid electrolyte layer 30 is a phosphoric acid salt-based solid electrolyte. For example, the phosphoric acid salt-based electrolyte has a NASICON structure. The phosphoric acid salt-based solid electrolyte having the NASICON structure has a high conductivity and is stable in normal atmosphere. The phosphoric acid salt-based solid electrolyte is, for example, such as a salt of phosphoric acid including lithium. The phosphoric acid salt is not limited. For example, the phosphoric acid salt is such as composite salt of phosphoric acid with Ti (for example $LiTi_2(PO_4)_3$). Alternatively, at least a part of Ti may be replaced with a transition metal of which a valence is four, such as Ge, Sn, Hf, or Zr. In order to increase an amount of Li, a part of Ti may be replaced with a transition metal of which a valence is three, such as Al, Ga, In, Y or La. In concrete, the phosphoric acid salt including lithium and having the NASICON structure is $Li_{1+x}Al_xGe_{2-x}(PO_4)_3$, $Li_{1+x}Al_xZr_{2-x}(PO_4)_3$, $Li_{1+x}Al_xT_{2-x}(PO_4)_3$ or the like. For example, it is preferable that Li—Al—Ge—PO$_4$-based material, to which a transition metal included in the phosphoric acid salt having the olivine type crystal structure included in the first electrode layer 11 and the second electrode layer 21 is added in advance, is used. For example, when the first electrode layer 11 and the second electrode layer 21 include phosphoric acid salt including Co and Li, it is preferable that the solid electrolyte layer 30 includes Li—Al—Ge—PO$_4$-based material to which Co is added in advance. In this case, it is possible to suppress solving of the transition metal included in the electrode active material into the electrolyte. When the first electrode layer 11 and the second electrode layer 21 include phosphoric acid salt including a transition element other Co and including Li, it is preferable that the solid electrolyte layer 30 includes Li—Al—Ge—PO$_4$-based material to which the transition element is added in advance.

At least, the first electrode layer 11 used as a positive electrode includes a material having an olivine type crystal structure, as an electrode active material. It is preferable that the second electrode layer 21 also includes the electrode active material. The electrode active material is such as phosphoric acid salt including a transition metal and lithium. The olivine type crystal structure is a crystal of natural olivine. It is possible to identify the olivine type crystal structure, by using X-ray diffraction.

For example, LiCoPO$_4$ including Co may be used as a typical example of the electrode active material having the olivine type crystal structure. Other salts of phosphoric acid, in which Co acting as a transition metal is replaced to another transition metal in the above-mentioned chemical formula, may be used. A ratio of Li or PO$_4$ may fluctuate in accordance with a valence. It is preferable that Co, Mn, Fe, Ni or the like is used as the transition metal.

The electrode active material having the olivine type crystal structure acts as a positive electrode active material in the first electrode layer 11 acting as a positive electrode. For example, when only the first electrode layer 11 includes the electrode active material having the olivine type crystal structure, the electrode active material acts as the positive electrode active material. When the second electrode layer 21 also includes an electrode active material having the olivine type crystal structure, discharge capacity may increase and an operation voltage may increase because of electric discharge, in the second electrode layer 21 acting as a negative electrode. The function mechanism is not completely clear. However, the mechanism may be caused by partial solid-phase formation together with the negative electrode active material.

When both the first electrode layer 11 and the second electrode layer 21 include an electrode active material having the olivine type crystal structure, the electrode active material of each of the first electrode layer 11 and the second electrode layer 21 may have a common transition metal. Alternatively, the transition metal of the electrode active material of the first electrode layer 11 may be different from that of the second electrode layer 21. The first electrode layer 11 and the second electrode layer 21 may have only single type of transition metal. The first electrode layer 11 and the second electrode layer 21 may have two or more types of transition metal. It is preferable that the first electrode layer 11 and the second electrode layer 21 have a common transition metal. It is more preferable that the electrode active materials of the both electrode layers have the same chemical composition. When the first electrode layer 11 and the second electrode layer 21 have a common transition metal or a common electrode active material of the same composition, similarity between the compositions of the both electrode layers increases. Therefore, even if terminals of the all solid battery 100 are connected in a positive/negative reversed state, the all solid battery 100 can be actually used without malfunction, in accordance with the usage purpose.

The second electrode layer 21 may include known material as the negative electrode active material. When only one of the electrode layers includes the negative electrode active material, it is clarified that the one of the electrode layers acts as a negative electrode and the other acts as a positive electrode. When only one of the electrode layers includes the negative electrode active material, it is preferable that the one of the electrode layers is the second electrode layer 21. Both of the electrode layers may include the known material as the negative electrode active material. Conventional technology of secondary batteries may be applied to the negative electrode active material. For example, titanium oxide, lithium-titanium complex oxide, lithium-titanium complex salt of phosphoric acid salt, a carbon, a vanadium lithium phosphate.

In the forming process of the first electrode layer 11 and the second electrode layer 21, moreover, oxide-based solid electrolyte material or a conductive material (conductive auxiliary agent) such as a carbon or a metal may be added. When the material is evenly dispersed into water or organic solution together with binder or plasticizer, paste for electrode layer is obtained. Pd, Ni, Cu, or Fe, or an alloy thereof may be used as a metal of the conductive auxiliary agent.

The first electric collector layer 12 and the second electric collector layer 22 are made of a conductive material. Pd is hardly oxidized and hardly reacts with each material, in a process of sintering each layer by firing. Among metals, Pd has large adhesive strength with ceramics. It is therefore possible to achieve large adhesive strength between the first electrode layer 11 and the first electric collector layer 12. And it is possible to achieve large adhesive strength between the second electrode layer 21 and the second electric collector layer 22. Accordingly, when the first electric collector layer 12 and the second electric collector layer 22 include Pd, the all solid battery 100 achieves preferable performance. As well as the conductive material, the first electric collector layer 12 and the second electric collector layer 22 may include C, or a metal such as Ni, Cu or Fe, or an alloy thereof.

In the all solid battery 100, when surface roughness of each layer is favorable, discontinuity part hardly occurs in each layer and short hardly occurs. However, when a maximum grain of the crystal grains of the solid electrolyte acting as a main component of the solid electrolyte layer 30 is not excessively small, the surface roughness of the solid electrolyte layer 30 may be degraded and the short may occur. And so, in the embodiment, a D50% grain diameter and a D90% grain diameter of the crystal grains of the solid electrolyte acting as the main component of the solid electrolyte layer 30 have an upper limit. In concrete, the D50% grain diameter is 0.5 μm or less, and the D90% grain diameter is 3 μm or less. In this case, the maximum grain diameter of the crystal grains is sufficiently small. Therefore, the surface roughness of the solid electrolyte layer 30 is favorable. And it is possible to suppress occurrence of the short.

It is possible to obtain the D50% grain diameter and the D90% grain diameter from the grain size distribution. It is possible to use Feret diameters as the crystal grain diameters. The Feret diameters are measured with respect to all crystal grains in an image captured by a scanning electron microscope or a transmission electron microscope.

It is preferable that the D50% grain diameter of the crystal grains of the solid electrolyte acting as the main component of the solid electrolyte layer 30 is 1 µm or less, from a viewpoint of suppression of the occurrence of the short. It is more preferable that the D50% grain diameter is 0.5 µm or less. It is preferable that the D90% grain diameter of the crystal grains of the solid electrolyte acting as the main component of the solid electrolyte layer 30 is 5 µm or less. It is more preferable that the D90% grain diameter is 3 µm or less.

On the other hand, when the crystal grain diameter of the solid electrolyte acting as the main component of the solid electrolyte layer 30 is excessively small, defect such as degradation of the ionic conductivity may occur. And so, it is preferable that the D50% diameter of the crystal grains of the solid electrolyte acting as the main component of the solid electrolyte layer 30 has a lower limit. In concrete, it is preferable that the D50% grain diameter is 0.05 µm or more. It is more preferable that the D50% grain diameter is 0.08 µm or more.

When the solid electrolyte layer 30 is excessively thick, output characteristic may be degraded and a capacity density may be reduced. And so, it is preferable that an average thickness of the solid electrolyte layer 30 has an upper limit. For example, it is preferable that the average thickness of the solid electrolyte layer 30 is 10 µm or less. It is more preferable that the average thickness is 5 µm or less. On other hand, when the solid electrolyte layer 30 is excessively thin, the short may occur. And so, it is preferable that the average thickness of the solid electrolyte layer 30 has a lower limit. For example, it is preferable that the average thickness of the solid electrolyte layer 30 is 0.5 µm or more. It is more preferable that the average thickness is 1.0 µm or more. When the maximum grain of the crystal grains of the solid electrolyte layer 30 of which the thickness is reduced is large, the surface roughness of the solid electrolyte layer 30 may be degraded. Therefore, when the solid electrolyte layer 30 is thin, the effect of regulating the grain diameter of the crystal grains of the solid electrolyte layer 30 is large.

The average thickness of the first electrode layer 11 and the second electrode layer 21 is not limited. However, when the electrode layer is excessively thin, the capacity density may be hardly increased. When the average thickness of the first electrode layer 11 and the second electrode layer 21 is excessively large, the response characteristic (output characteristic) of the all solid battery 100 may be degraded. And so, it is preferable that the average thickness of the first electrode layer 11 and the second electrode layer 21 is 1 µm or more and 100 µm or less. It is more preferable that the average thickness of the first electrode layer 11 and the second electrode layer 21 is 2 µm or more and 50 µm or less.

The average thickness of the first electric collector layer 12 and the second electric collector layer 22 is not limited. However, it is preferable that the average thickness is 0.5 µm or more and 10 µm or less. When the average thickness of the first electric collector layer 12 and the second electric collector layer 22 is less than 0.5 µm, increasing of resistance may be a problem because a path of electronic conduction gets longer when the all solid battery 100 gets larger. When the average thickness of the first electric collector layer 12 and the second electric collector layer 22 is less than 0.5 µm, smoothness of a coated film may be degraded. When the average thickness of the first electric collector layer 12 and the second electric collector layer 22 is more than 10 µm, the energy density may be reduced. It is more preferable that the average thickness of the first electric collector layer 12 and the second electric collector layer 22 is 1 µm or more and 5 µm or less.

It is preferable that the first electrode layer 11 and the second electrode layer 21 include phosphoric acid salt-based solid electrolyte grains of which the D50% grain diameter is 0.5 µm or less and of which the D90% grain diameter is 3 µm or less. In this case, sufficient interface formation and high ionic conductivity may be achieved.

Second Embodiment

Figure 2:
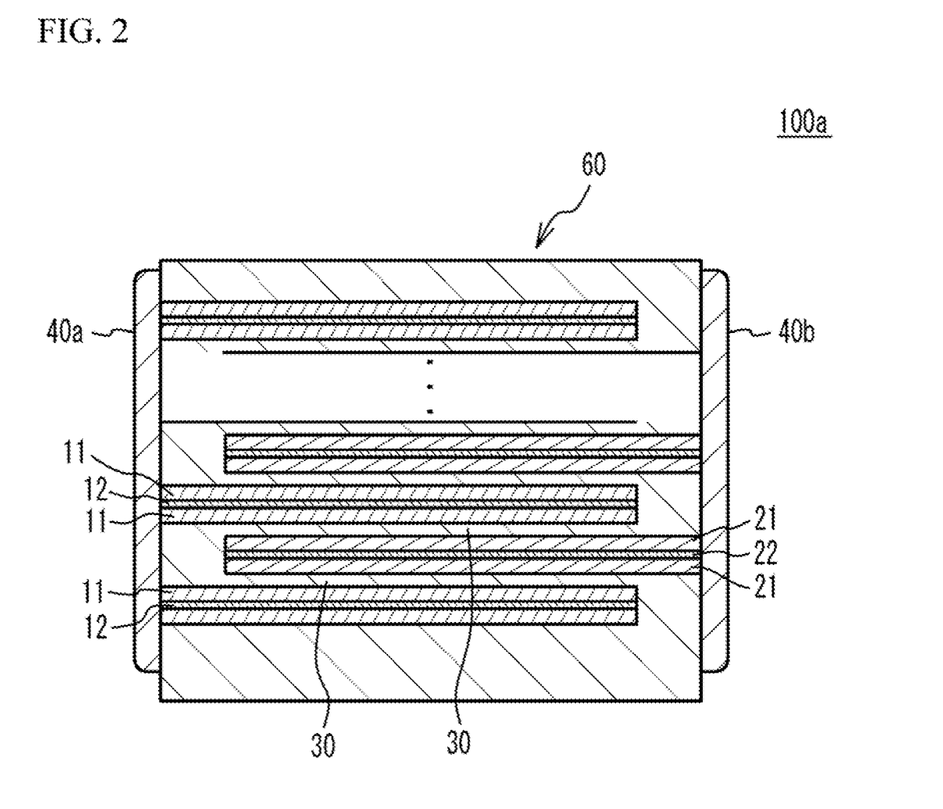
FIG. 2 illustrates a schematic cross section of an all solid battery in accordance with a second embodiment.

FIG. 2 illustrates a schematic cross section of an all solid battery 100a in accordance with a second embodiment. The all solid battery 100a has a multilayer chip 60 having a rectangular parallelepiped shape, a first external electrode 40a provided on a first edge face of the multilayer chip 60, and a second external electrode 40b provided on a second edge face facing with the first edge face. In the following description, the same numeral is added to each member that is the same as that of the all solid battery 100. And, a detail explanation of the same member is omitted.

In the all solid battery 100a, each of the first electric collector layers 12 and each of the second electric collector layers 22 are alternately stacked. Edges of the first electric collector layers 12 are exposed to the first edge face of the multilayer chip 60 but are not exposed to the second edge face of the multilayer chip 60. Edges of the second electric collector layers 22 are exposed to the second edge face of the multilayer chip 60 but are not exposed to the first edge face. Thus, each of the first electric collector layers 12 and each of the second electric collector layers 22 are alternately conducted to the first external electrode 40a and the second external electrode 40b.

The first electrode layer 11 is stacked on the first electric collector layer 12. The solid electrolyte layer 30 is stacked on the first electrode layer 11. The solid electrolyte layer 30 extends from the first external electrode 40a to the second external electrode 40b. The second electrode layer 21 is stacked on the solid electrolyte layer 30. The second electric collector layer 22 is stacked on the second electrode layer 21. Another second electrode layer 21 is stacked on the second electric collector layer 22. Another solid electrolyte layer 30 is stacked on the second electrode layer 21. The solid electrolyte layer 30 extends from the first external electrode 40a to the second external electrode 40b. The first electrode layer 11 is stacked on the solid electrolyte layer 30. In the all solid battery 100a, the stack units are repeatedly stacked. Therefore, the all solid battery 100a has a structure in which a plurality of cell units are stacked.

In the structure, the D50% grain diameter of the crystal grains structuring the solid electrolyte layer 30 is 0.5 µm or less, and the D90% grain diameter of the crystal grains is 3 µm or less. It is therefore possible to suppress occurrence of the short.

Figure 3:
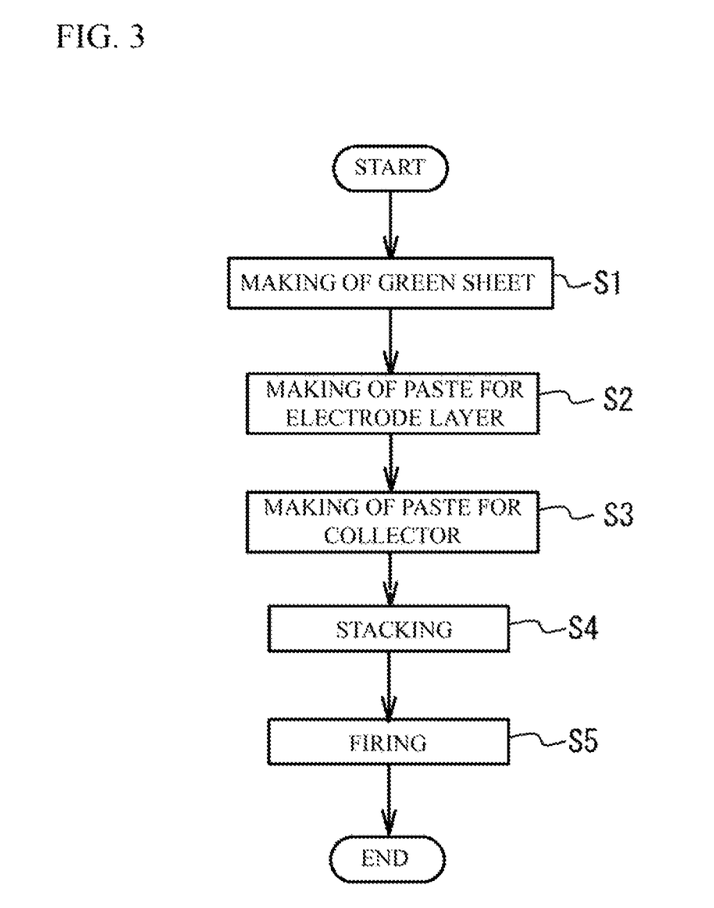
FIG. 3 illustrates a flowchart of a manufacturing method of an all solid battery.

Next, a description will be given of a manufacturing method of the all solid battery 100 and the all solid battery 100a. FIG. 3 illustrates a flowchart of the manufacturing method of the all solid battery 100 and the all solid battery 100a.

(Making Process of Green Sheet)
Powder of the phosphoric acid salt-based solid electrolyte structuring the solid electrolyte layer 30 is made. For example, it is possible to make the powder of the phosphoric acid salt-based solid electrolyte structuring the solid electrolyte layer 30, by mixing raw material and additives and using solid phase synthesis method or the like. The resulting powder is subjected to dry grinding. Thus, a grain diameter of the resulting power is adjusted to a desired one. For example, the grain diameter of the resulting power is adjusted to a desired one by a planetary ball mil using $ZrO_2$ balls having a diameter of 5 mm cp.

The resulting powder is evenly dispersed into aqueous solvent or organic solvent together with a binding agent, a dispersing agent, a plasticizer and so on. The resulting power is subjected wet crushing. And solid electrolyte slurry having a desired grain diameter is obtained. In this case, a bead mill, a wet jet mill, a kneader, a high pressure homogenizer or the like may be used. It is preferable that the bead mill is used because adjusting of particle size distribution and dispersion are performed at the same time. For example, the bead diameter is 1.5 mm φ. And the wet crushing is performed until the D90% grain diameter becomes 2 μm or less. Moreover, the bead diameter is 1 mm φ. And the wet crushing is performed until the D50% grain diameter becomes 0.3 μm or less. A binder is added to the resulting solid electrolyte slurry. Thus, solid electrolyte paste is obtained. The solid electrolyte paste is coated. Thus, a green sheet is obtained. The coating method is not limited. For example, a slot die method, a reverse coat method, a gravure coat method, a bar coat method, a doctor blade method or the like may be used. It is possible to measure grain diameter distribution after the wet crushing, with use of a laser diffraction measuring device using a laser diffraction scattering method.

(Making Process of Paste for Electrode Layer)

Next, paste for electrode layer is made in order to make the first electrode layer 11 and the second electrode layer 21. For example, a conductive auxiliary agent, an active material, a solid electrolyte material, a binder, a plasticizer and so on are evenly dispersed into water or organic solvent. Thus, paste for electrode layer is obtained. The above-mentioned solid electrolyte paste may be used as the solid electrolyte material. Moreover, Pd, Ni, Cu, Fe or an alloy thereof, or carbon materials may be used as the conductive auxiliary agent. When the composition of the first electrode layer 11 is different from that of the second electrode layer 21, paste for electrode layer used for the first electrode layer 11 and another paste for electrode layer used for the second electrode layer 21 may be individually made.

(Making Process of Paste for Electric Collector)

Next, paste for electric collector is made in order to make the first electric collector layer 12 and the second electric collector layer 22. It is possible to make the paste for electric collector, by evenly dispersing powder of Pd, board-shaped graphite carbon, a binder, dispersant, plasticizer and so on into water or organic solvent.

(Stacking Process)

The paste for electrode layer and the paste for electric collector are printed on both faces of the green sheet, with respect to the all solid battery 100 described on the basis of FIG. 1. The printing method is not limited. For example, a screen printing method, an intaglio printing method, a letter press printing method, a calendar roll printing method or the like may be used. In order to make a stacked device having a thin layer and a large number of stacked layers, the screen printing is generally used. However, an ink jet printing may be preferable when a micro size electrode pattern or a special shape is necessary.

Figure 4:
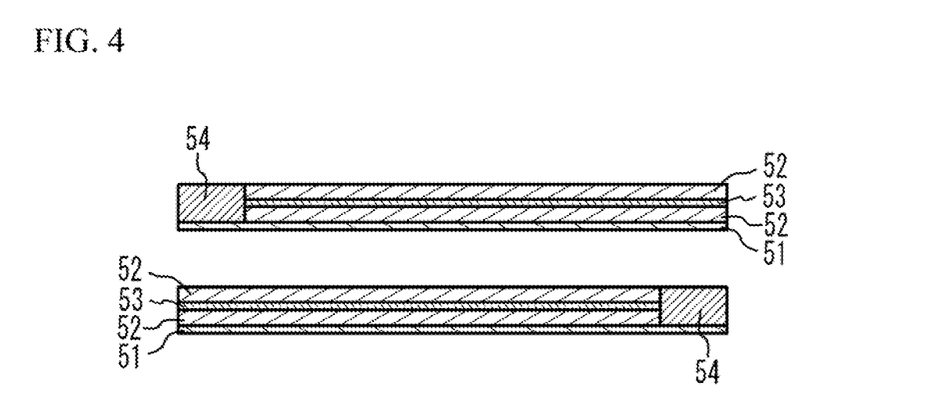
FIG. 4 illustrates a stacking process.

With respect to the all solid battery 100a described on the basis of FIG. 2, paste 52 for electrode layer is printed on one face of a green sheet 51 as illustrated in FIG. 4. Paste 53 for electric collector is printed on the paste 52 for electrode layer. And, another paste 52 for electrode layer is printed on the paste 53 for electric collector. A reverse pattern 54 is printed on a part of the green sheet 51 where neither the paste 52 for electrode layer nor the paste 53 for electric collector is printed. A material of the reverse pattern 54 may be the same as that of the green sheet 51. The green sheets 51 after printing are stacked so that each of the green sheets 51 is alternately shifted to each other. Thus, a multilayer structure is obtained. In this case, in the multilayer structure, a pair of the paste 52 for electrode layer and the paste 53 for electric collector are alternately exposed to the two edge faces of the multilayer structure.

(Firing Process)

Next, the obtained multilayer structure is fired. The firing is performed in an oxidizing atmosphere or non-oxidizing atmosphere. A maximum temperature of the firing is 400 degrees C. to 1000 degrees C. It is preferable that the maximum temperature is 500 degrees C. to 900 degrees C. In order to sufficiently remove the binder before the maximum temperature, a temperature lower than the maximum temperature may be held in an oxidizing atmosphere. It is preferable that the multilayer structure is fired at a minimum temperature in an oxidizing atmosphere, in order to reduce the process cost. After firing, a re-oxidation process may be performed. In this manner, the all solid battery 100 or the all solid battery 100a is manufactured. It is possible to achieve the condition in which the D50% grain diameter of the crystal grains of the solid electrolyte acting as the main component of the solid electrolyte layer 30 is 0.5 μm or less, and the D90% grain diameter of the crystal grains is 3 μm or less, by adjusting the firing condition.

In the manufacturing method of the embodiment, in the green sheet, the D90% grain diameter of the oxide-based solid electrolyte is 2 μm or less, and the D50% grain diameter of the oxide-based solid electrolyte is 0.3 μm or less. Therefore, even if crystals grow in the sintering of the firing process, the D90% grain diameter of the crystal grains structuring the solid electrolyte layer 30 is 3 μm or less, and the D50% grain diameter of the crystal grains is 0.5 μm or less. In this case, the maximum grain diameter of the crystal grains is sufficiently small. Therefore, the surface roughness of the solid electrolyte layer 30 is favorable. And it is possible to suppress occurrence of the short.

It is preferable that the D90% grain diameter of the oxide-based solid electrolyte in the green sheet is 3 μm or less, for the purpose of achieving the condition in which the D50% grain diameter of the crystal grains structuring the solid electrolyte layer 30 is 0.5 μm or less and the D90% grain diameter of the crystal grains is 3 μm or less. It is more preferable that the D90% grain diameter of the oxide-based solid electrolyte in the green sheet is 2 μm or less. It is preferable that the D50% grain diameter of the oxide-based solid electrolyte is 0.5 μm or less. It is more preferable that the D50% grain diameter of the oxide-based solid electrolyte is 0.3 or less.

From a viewpoint of suppression of the occurrence of the short, it is preferable to achieve the condition in which the D50% grain diameter of the crystal grains of the solid electrolyte acting as the main component of the solid electrolyte layer 30 is 1 μm or less, by adjusting the firing condition. It is more preferable to achieve the condition in which the D50% grain diameter of the crystal grains is 0.5 μm or less. It is preferable that the D90% grain diameter of the crystal grains of the solid electrolyte acting as the main component of the solid electrolyte layer 30 is 5 μm or less. It is more preferable that the D90% grain diameter of the crystal grains is 3 μm or less.

On the other hand, when the crystal grain diameter of the solid electrolyte acting as the main component of the solid electrolyte layer 30 is excessively small, defect such as degradation of the ionic conductivity may occur. And so, it is preferable to achieve the condition in which the D50% grain diameter of the crystal grains of the solid electrolyte acting as the main component of the solid electrolyte layer 30 has a lower limit, by adjusting the firing condition. In concrete, it is preferable that the D50% grain diameter is 0.05 µm or more. It is more preferable that the D50% grain diameter is 0.08 µm or more.

When the green sheet is excessively thick, solid electrolyte layer 30 is also thick and output characteristic may be degraded and a capacity density may be reduced. And so, it is preferable that an average thickness of the green sheet has an upper limit. For example, it is preferable that the average thickness of the green sheet is 10 µm or less. It is more preferable that the average thickness is 5 µm or less. On other hand, when the green sheet is excessively thin, the solid electrolyte layer 30 is also thin and the short may occur. And so, it is preferable that the average thickness of the green sheet has a lower limit. For example, it is preferable that the average thickness of the green sheet is 0.3 µm or more. It is more preferable that the average thickness is 0.5 µm or more. When the maximum grain of the crystal grains is large in a case where the thickness of the green sheet is reduced, the surface roughness of the solid electrolyte layer 30 may be degraded. Therefore, when the green sheet is thin, the effect of regulating the grain diameter of the crystal grains of the solid electrolyte layer 30 gets larger.

When the surface roughness (Ra) nm of the green sheet is excessively large, the surface roughness (Ra) nm of the solid electrolyte layer 30 is also large. In this case, the short may occur. And so, it is preferable that the surface roughness (Ra) of the green sheet has an upper limit. In concrete, it is preferable that the surface roughness (Ra) of the green sheet is 300 nm or less. It is more preferable that the surface roughness (Ra) of the green sheet is 80 nm or less.

EXAMPLES

The all solid batteries in accordance with the embodiment were made and the property was measured.

Example 1

$Co_3O_4$, $Li_2CO_3$, dihydrogen phosphate ammonium, $Al_2O_3$, $GeO_2$ were mixed and were used as solid electrolyte material powder. From the solid electrolyte material powder, $Li_{1.3}Al_{0.3}Ge_{1.7}(PO_4)_3$ including a predetermined amount of Co was made by a solid phase synthesizing. The resulting power was dry-crushed by $ZrO_2$ balls of 5 mm φ (30 min at a rotation speed of 400 rpm with use of planetary ball mil). The D90% grain diameter was 5 µm or less. Moreover, the resulting powder was wet-crushed (dispersing medium: ion exchange water or ethanol) with beads of 1.5 mm φ so that the D90% grain diameter was 3 µm. Further, the resulting powder was wet-crushed with beads of 1 mm φ so that the D50% grain diameter was 0.3 µm. Thus, solid electrolyte slurry having the D50% grain diameter of 0.3 µm and the D90% grain diameter of 2 µm was made. The grain size distribution was measured by collecting the slurry in a small amount of ethanol, dispersing the slurry in ultrasonic bath for 1 minute, and measuring the resulting solution with use of a laser diffraction/scattering type grain size measuring device LA-950 or LA-960 (made by HORIBA Ltd.).

Solid electrolyte paste was obtained by adding a binder to the resulting slurry. And, green sheet having a thickness of 10 µm was made. The surface roughness (Ra) of the green sheet was 80 nm. $Li_{1.3}Al_{0.3}Ti_{1.7}(PO_4)_3$ including a predetermined amount of $LiCoPO_4$ and Co was synthesized by a solid phase synthesizing as well as the above-mentioned oxide. The resulting $Li_{1.3}Al_{0.3}Ti_{1.7}(PO_4)_3$ was wet blended and was subjected to dispersing. Thus, slurry was obtained. A binder and Pd paste were added to the slurry. Thus, paste for electrode layer was made.

The paste for electrode layer having a thickness of 2 µm was printed on the green sheet. And the Pd paste as paste for electric collector layer having a thickness of 1 µm was printed on the paste for electrode layer. Moreover, the paste for electrode layer having a thickness of 2 µm was printed on the Pd paste. 11 numbers of the resulting sheets were stacked so that each electrode is alternately shifted to right and left sides. And stacked green sheets having an average thickness of 50 µm was affixed to an upper face and a lower face of the stacked sheets. The multilayer structure was crimped by a pressing of a single axis. Thus, 1000 samples of the multilayer structure having 10 mm φ were made.

The binder was removed from the multilayer structures by thermal treatment within a temperature range of 300 degrees C. to 500 degrees C. The resulting multilayer structures were sintered within a temperature range of 900 degrees C. or less. Thus, sintered structures were made. Cross sections of sintered solid electrolyte were observed by SEM, and grain diameters were measured. In concrete, magnification was adjusted so that a single image includes 80 to 150 numbers of crystal grains, with use of the scanning electron microscope. And a plurality of images were captured so that a total number of the crystal grains was 400 or more. Feret diameters of all crystal grains of the images were measured. The sintered structures were embedded by resin. Cross sections were exposed by a mechanical polishing. The exposed cross sections were subjected to Ar ion milling. And obtained smoothed cross sections were observed. An acceleration voltage of SEM was 4 kV or less. Tangential diameters in a predetermined direction of 300 numbers or more of grains were measured. And, the D50% grain diameter and the D90% grain diameter were calculated. In an example 1, the D50% grain diameter was 0.45 µm, and the D90% grain diameter was 2.9 µm.

Example 2

In an example 2, the D50% grain diameter of the solid electrolyte in the solid electrolyte paste was 0.3 µm. The D90% grain diameter of the solid electrolyte was 2 µm. The average thickness of the green sheet was 5 µm. The surface roughness (Ra) of the green sheet was 78 nm. Other conditions were the same as those of the example 1. In the sintered structure, the D50% crystal grain diameter of the solid electrolyte in the solid electrolyte layer 30 was 0.35 µm. The D90% crystal grain diameter of the solid electrolyte was 2.8 µm.

Example 3

In an example 3, the D50% grain diameter of the solid electrolyte in the solid electrolyte paste was 0.07 µm. The D90% grain diameter of the solid electrolyte was 1.2 µm. The average thickness of the green sheet was 5 µm. The surface roughness (Ra) of the green sheet was 30 nm. Other conditions were the same as those of the example 1. In the sintered structure, the D50% crystal grain diameter of the solid electrolyte in the solid electrolyte layer 30 was 0.08 µm. The D90% crystal grain diameter of the solid electrolyte was 1.5 µm.

Example 4

In an example 4, the D50% grain diameter of the solid electrolyte in the solid electrolyte paste was 0.3 μm. The D90% grain diameter of the solid electrolyte was 2 μm. The average thickness of the green sheet was 2 μm. The surface roughness (Ra) of the green sheet was 77 nm. Other conditions were the same as those of the example 1. In the sintered structure, the D50% crystal grain diameter of the solid electrolyte in the solid electrolyte layer 30 was 0.42 μm. The D90% crystal grain diameter of the solid electrolyte was 2.7 μm.

Example 5

In an example 5, the D50% grain diameter of the solid electrolyte in the solid electrolyte paste was 0.07 μm. The D90% grain diameter of the solid electrolyte was 1.2 μm. The average thickness of the green sheet was 2 μm. The surface roughness (Ra) of the green sheet was 28 nm. Other conditions were the same as those of the example 1. In the sintered structure, the D50% crystal grain diameter of the solid electrolyte in the solid electrolyte layer 30 was 0.08 μm. The D90% crystal grain diameter of the solid electrolyte was 1.5 μm.

Comparative Example 1

In a comparative example 1, the D50% grain diameter of the solid electrolyte in the solid electrolyte paste was 0.3 μm. The D90% grain diameter of the solid electrolyte was 2.5 μm. The average thickness of the green sheet was 10 μm. The surface roughness (Ra) of the green sheet was 95 nm. Other conditions were the same as those of the example 1. In the sintered structure, the D50% crystal grain diameter of the solid electrolyte in the solid electrolyte layer 30 was 0.4 μm. The D90% crystal grain diameter of the solid electrolyte was 3.2 μm.

Comparative Example 2

In a comparative example 2, the D50% grain diameter of the solid electrolyte in the solid electrolyte paste was 0.4 μm. The D90% grain diameter of the solid electrolyte was 2 μm. The average thickness of the green sheet was 10 μm. The surface roughness (Ra) of the green sheet was 86 nm. Other conditions were the same as those of the example 1. In the sintered structure, the D50% crystal grain diameter of the solid electrolyte in the solid electrolyte layer 30 was 0.55 μm. The D90% crystal grain diameter of the solid electrolyte was 3.1 μm.

(Analysis)

External electrodes were formed on right and left side faces of the sintered structures obtained in the examples 1 to 5 and the comparative examples 1 and 2, by gold sputtering. Thus, the all solid batteries described on the basis of FIG. 2 were made. And, it was determined whether the short occurred or not. Table 1 shows the results. In the example 1, the short occurred in only one sample. Therefore, the short rate was 0.1%. In the example 2, the short rate was 0.2%. In the example 3, the short rate was 0.1%. In the example 4, the short rate was 0.7%. In the example 5, the short rate was 0.3%. In this manner, in the examples 1 to 5, the short rate was 1% or less. It is thought that this was because the D50% grain diameter of the crystal grains of the solid electrolyte structuring the solid electrolyte layer 30 was 0.5 μm or less and the D90% grain diameter was 3 μm or less, and the maximum grain diameter of the crystal grains was sufficiently small. On the other hand, in the comparative example 1, the short rate was 2.3%. In the comparative example 2, the short rate was 1.2%. It is thought that this was because the D50% grain diameter was more than 0.5 μm, or the D90% grain diameter was more than 3 μm.

TABLE 1

| | SOLID ELECTROLYTE PASTE | | SHEET | SHEET THICK- | FIRED SOLID ELECTROLYTE LAYER | | SHORT | (CAPACITY AT 25° C./ CAPACITY | TOTAL |
|---|---|---|---|---|---|---|---|---|---|
| | D50% (μm) | D90% (μm) | Ra (nm) | NESS (μm) | D50% (μm) | D90% (μm) | RATE (%) | AT 80° C.) (%) | DETERMI- NATION |
| EXAMPLE 1 | 0.3 | 2 | 80 | 10 | 0.45 | 2.9 | 0.1 | 60 | ◎ |
| EXAMPLE 2 | 0.3 | 2 | 78 | 5 | 0.35 | 2.8 | 0.2 | 73 | ○ |
| EXAMPLE 3 | 0.07 | 1.2 | 30 | 5 | 0.08 | 1.5 | 0.1 | 75 | ◎ |
| EXAMPLE 4 | 0.3 | 2 | 77 | 2 | 0.42 | 2.7 | 0.7 | 78 | ○ |
| EXA,PLE 5 | 0.07 | 1.2 | 28 | 2 | 0.08 | 1.5 | 0.3 | 80 | ○ |
| COMPARATIVE EXAMPLE 1 | 0.3 | 2.5 | 95 | 10 | 0.4 | 3.2 | 2.3 | 55 | X |
| COMPARATIVE EXAMPLE 2 | 0.4 | 2 | 86 | 10 | 0.55 | 3.1 | 1.2 | 56 | X |

Moreover, CC discharge and charge (charging current: 0.2 C, discharging current: 0.2 C, upper limit of cut voltage: 2.7 V, lower limit of cut voltage: 0.5 V) were measured. And, a ratio of a discharge capacity at 25 degrees C. in a case where a discharge capacity at 80 degrees C. was 100% was evaluated as response. The response of the example 1 was 60%. The response of the example 2 was 73%. The response of the example 3 was 75%. The response of the example 4 was 78%. The response of the example 5 was 80%. In this manner, the response of the examples 1 to 5 was 60% or more which was favorable. It is thought that this was because the maximum grain diameter of the crystal grains structuring the solid electrolyte layer 30 was sufficiently small when the D50% grain diameter of the crystal grains was 0.5 μm or less and the D90% grain diameter of the crystal grains was 3 μm or less. On the other hand, the response of the comparative example 1 was 55%. The response of the comparative example 2 was 56%. It is thought that this was because the D50% grain diameter was more than 0.5 μm or the D90% grain diameter was more than 3 μm.

The case where the short rate was less than 0.1 was totally determined as very good "double circle". The examples 1 and 3 were totally determined as very good "double circle". It is thought that the short rate of the example 1 was small because the thickness of the solid electrolyte layer was 5 µm to 10 µm, D50% grain diameter of the solid electrolyte paste was 0.2 µm to 0.3 µm, the Ra of the sheet was sufficiently small with respect to the thickness of the sheet, the D50% grain diameter of the crystal grains of the solid electrolyte was 0.3 µm to 0.5 µm, the D90% grain diameter of the crystal grains was 3 µm or less, and homogeneous micro structure was remained. Similarly, it is thought that the short rate of the example 3 was small because the thickness of the solid electrolyte layer was 2 µm to 5 µm, D50% grain diameter of the solid electrolyte paste was 0.05 µm to 0.1 µm, the Ra of the sheet was sufficiently small with respect to the thickness of the sheet, the D50% grain diameter of the crystal grains of the solid electrolyte was 0.05 µm to 0.1 µm, the D90% grain diameter of the crystal grains was 3 µm or less, and homogeneous micro structure was remained.

Although the embodiments of the present invention have been described in detail, it is to be understood that the various change, substitutions, and alterations could be made hereto without departing from the spirit and scope of the invention.

What is claimed is:

1. An all solid battery comprising:
    a solid electrolyte layer including phosphoric acid salt-based solid electrolyte;
    a first electrode that is formed on a first main face of the solid electrolyte layer; and
    a second electrode that is formed on a second main face of the solid electrolyte layer,
    wherein a D50% grain diameter of crystal grains of the phosphoric acid salt-based solid electrolyte is 0.5 µm or less,
    wherein a D90% grain diameter of the crystal grains is 3 µm or less.

2. The all solid battery as claimed in claim 1, wherein the D50% grain diameter of the crystal grains is 0.08 µm or more and 0.5 µm or less.

3. The all solid battery as claimed in claim 1, wherein an average thickness of the solid electrolyte layer is 10 µm or less.

4. The all solid battery as claimed in claim 1, wherein the first electrode includes a first electrode layer on a side of the solid electrolyte layer and a first electric collector layer on an side opposite to the solid electrolyte layer,
    wherein the second electrode includes a second electrode layer on a side of the solid electrolyte layer and a second electric collector layer on an side opposite to the solid electrolyte layer,
    wherein at least one of the first electrode layer and the second electrode layer includes phosphoric acid salt-based solid electrolyte of which a D50% grain diameter of crystal grains is 0.5 µm or less and of which a D90% grain diameter of the crystal grains is 3 µm or less.

5. The all solid battery as claimed in claim 1, wherein the phosphoric acid salt-based solid electrolyte has a NASICON structure.

6. A manufacturing method of an all solid battery comprising:
    preparing a multilayer structure in which first coated electric collector paste, first coated electrode paste including ceramic grains, a green sheet including phosphoric acid salt-based solid electrolyte grains, second coated electrode paste including ceramic grains and second coated electric collector paste are stacked in this order; and
    firing the multilayer structure,
    wherein a D50% grain diameter of the phosphoric acid salt-based solid electrolyte grains is 0.3 µm or less and a D90% grain diameter of the phosphoric acid salt-based solid electrolyte grains is 2 µm or less,
    wherein a firing condition of the firing is adjusted so that a D50% grain diameter of crystal grains of solid electrolyte in a solid electrolyte layer to be formed in the firing from the green sheet is 0.5 µm or less and a D90% grain diameter of the crystal grains is 3 µm or less.

7. The method as claimed in claim 6, wherein the phosphoric acid salt-based solid electrolyte grains of which the D50% grain diameter is 0.3 µm or less and of which the D90% grain diameter is 2 µm or less are made by wet-crushing a phosphoric acid salt-based solid electrolyte material.

8. Solid electrolyte paste comprising:
    phosphoric acid salt-based solid electrolyte grains of which a D50% grain diameter is 0.3 µm or less and of which a D90% grain diameter is 2 µm or less;
    dispersing medium for dispersing the solid electrolyte grains; and
    a binder.

9. The all solid battery as claimed in claim 1, wherein each of the solid electrolyte layer, the first electrode, and the second electrode, is a solid layer.

10. The all solid battery as claimed in claim 1, wherein each of the solid electrolyte layer, the first electrode, and the second electrode, is a sintered layer.

* * * * *